May 21, 1935. F. W. ENGLAND 2,001,956
LOCK WASHER AND METHOD OF MAKING SAME
Filed Nov. 24, 1933
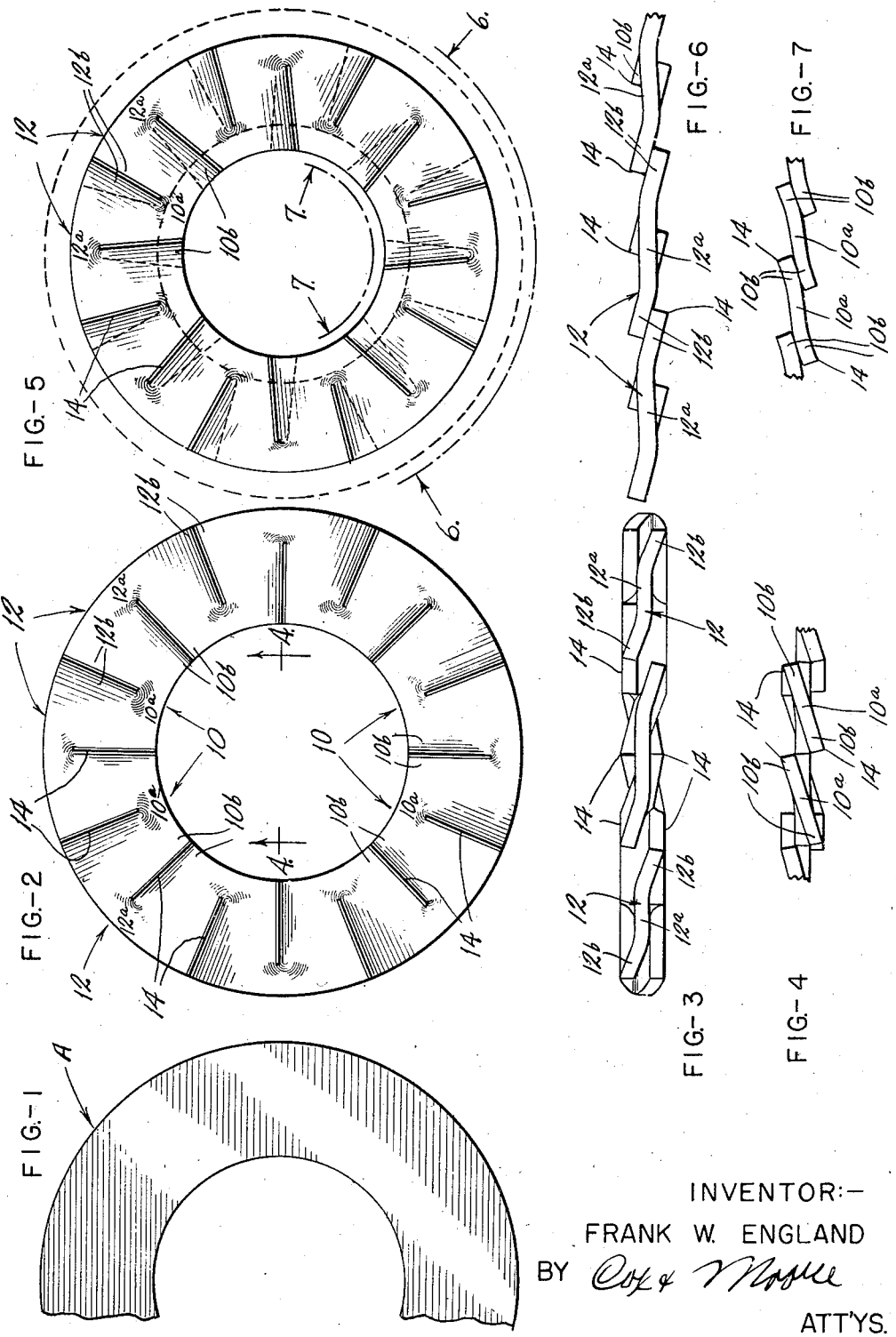
INVENTOR:—
FRANK W. ENGLAND
BY
ATT'YS.

Patented May 21, 1935

2,001,956

UNITED STATES PATENT OFFICE 2,001,956

LOCK WASHER AND METHOD OF MAKING SAME

Frank W. England, Chicago, Ill., assignor to Illinois Tool Works, Chicago, Ill., a corporation of Illinois Application November 24, 1933, Serial No. 699,534

11 Claims. (Cl. 10—86)

My invention relates generally to lock washers and methods of making same, and more particularly to lock washers of the overlapping tooth type and to improved methods of making same.

It is one of the primary objects of my invention to provide a washer of the overlapping tooth type, namely, the type wherein adjacent radial margins or prongs are disposed in overlapping relation, by practicing simplified improved methods which bring about this overlapping relationship.

More particularly, it is an object of my invention to provide methods of the type mentioned above wherein a washer blank may be radially slitted to present a plurality of prongs, and subsequently reduced in diameter so as to bring about an overlapping relationship of adjacent radial margins of the prongs.

More specifically, my invention contemplates a washer of the overlapping tooth type wherein certain of the overlapping prong margins extend inwardly from the outer margin of the washer stock, and certain others extend outwardly from the inner margin of said stock.

The invention further contemplates forming an annular washer blank with radial inner and outer severances or slits, then deflecting the sections of the stock on each side of said slits in opposite directions so as to present a plurality of work engaging edges, and subsequently reducing the external diameter of the washer so as to bring about an overlapping relationship of the deflected sections, thereby producing a washer having a plurality of overlapping prongs.

It is a further object of my invention to produce a method of making lock washers of the above mentioned overlapping type whereby the washer stock is subjected to a minimum amount of strain and distortion when the diameter of the washer is reduced to produce the overlapping effect, and I propose to accomplish this by alternately slitting inner and outer sections of the annular washer stock.

The foregoing and numerous other objects and advantages will be more apparent from the following detailed description when considered in connection with the accompanying drawing, wherein—

Figure 1 discloses an annular washer blank from which my improved washer is adapted to be made;

Figure 2 is an elevational view of the blank after the inner and outer margins thereof have been provided with radial slits and the metal disposed at each side of the slits has been deflected in opposite directions out of the plane of the washer stock;

Figure 3 is a view of the external edge of the device of Figure 2;

Figure 4 is a fragmentary view of the internal edge of the device in Figure 2, said view being taken substantially along the line 4—4 of Figure 2;

Figure 5 discloses the completed lock washer after the device of Figure 2 has been reduced in diameter for the purpose of producing the overlapping relationship of the adjacent margins of the prongs, the dotted circles in this figure designating the original inner and outer peripheries of the washer prior to the diameter reducing operation;

Figure 6 is a fragmentary view of the outer edge of the washer of Figure 5 when said washer is clamped against a work piece, said view being taken substantially along the line 6—6 of Figure 5; and Figure 7 is a fragmentary view of the inner edge of the washer of Figure 5, said view being taken substantially along the line 7—7 of Figure 5.

Referring now to the drawing more in detail wherein like numerals have been employed to designate similar parts throughout the various figures, it will be seen that my invention contemplates the production of a washer from annular washer blanks, which I have designated generally by the letter A. This blank A is first radially slit or severed along the inner and outer margins as indicated in Figures 2 to 4, inclusive, so as to present inner marginal prongs 10 and outer marginal prongs 12. Each of the prongs 10 includes what I prefer to designate as a central body portion 10a and a pair of radial marginal sections 10b. Likewise, each of the prongs 12 includes a central body portion 12a and oppositely disposed marginal sections 12b. In Figures 2 to 4, inclusive, I have shown the marginal sections 10b and 12b deflected out of the plane of the washer so as to present a plurality of radial work engaging edges 14 positioned on opposite sides of the washer body and disposed in substantial parallelism with said body.

After the marginal sections 10b and 12b have been deflected out of the normal plane of the washer, I cause the structure to be reduced in diameter as indicated in Figure 5. By reason of the fact that the washer body is originally slit a distance which is approximately equal to two-thirds of the radial width of the body, and further, in view of the deflecting of the stock adjacent said slits, these sections 10b and 12b assume the overlapping relationship shown in Figure 5 when the washer structure is subjected to a force which tends to reduce the diameter, said force obviously being exerted in a radial direction toward the center of the washer. Various devices or combination of devices may be employed to effect the reduction in diameter to produce the overlapping prong effect. For instance, the washer may be forced through a tapered aperture, or it may be placed in a die having a plurality of inwardly extending jaws similar to a work holding chuck used in a lathe, or it may be placed in a die which operates by a draw-in collet of a lathe, which is simply a die made up of a plurality of members forming a cylindrical nest in a ring, and tapered on the outside to fit a tapered hole or seat in the ring. In view of the fact that the present invention is not concerned with the specific form of dies, punches, and the like, which may be employed in practicing my improved method, no illustration is made of these devices. It will suffice to say, however, that the invention contemplates the use of various forms of devices whereby my improved method of producing washers of the overlapping type may be employed. In Figure 5 I have indicated by dotted lines the original inner and outer diameters of the washer prior to the step of reducing the diameter to produce the overlapping effect.

Particular attention is directed to the fact that when my improved method is practiced, the metal is subjected to little strain or distortion as compared with methods wherein a continuous annular ring or body must be compressed to effect a reduction in diameter. In other words, by having prongs positioned along both the inner and outer margins of the washer in the manner described, the entire structure may be reduced in diameter without subjecting the main body of the washer to compression. The fact that the prong sections 10b and 12b are in position to slide over one another when force is applied to the outer periphery of the washer in an inner radial direction, precludes the necessity of subjecting the main body of the washer stock to any compressive or deleterious strains. It will also be noted that the original thickness of the washer stock is maintained in the main body of the washer. No stretching or expansion of the metal takes place, although a reduction in diameter is experienced. Having a plurality of work engaging edges spaced from and arranged in substantial parallelism with the main body of the washer along the inner and outer margins as shown in Figure 5, presents a washer having increased locking effectiveness. The fact that the work engaging edges extend a radial distance which is substantially equal to two-thirds of the normal radial width of the washer, increases the effective locking area as compared with other types of pronged lock washers with which I am familiar. It may be stated that the work engaging edge of one prong extends into the body of the other prong. In other words, a work engaging edge provided on one of the inner prong sections 10b extends outwardly a radial distance sufficient to encroach upon the body portion 12a of the prongs 12. Similarly, the work engaging edges of the outer prong sections 12b extend into the body portion 10a of the prongs 10. This arrangement, in effect, imparts a zigzag configuration to the portion of the washer which is unslit.

My invention is in no sense limited to the specific structural features set forth herein, but is capable of other modifications and changes without departing from the spirit and scope thereof.

Having thus described my invention, what I claim as new and desire to secure by Letters Patent is:

1. A lock washer including an annular body of flat spring stock provided with a plurality of inner and outer marginal prongs, each prong having a marginal section overlapping the marginal section of an adjacent prong, whereby to present a plurality of inner and outer overlapping prong sections having work engaging edges positioned on opposite sides of a median plane of the washer, each prong being substantially uniform in thickness.

2. A lock washer including an annular body of flat spring stock provided with a plurality of inner and outer marginal prongs, each prong having a marginal section overlapping the marginal section of an adjacent prong, whereby to present a plurality of inner and outer overlapping prong sections having work engaging edges positioned on opposite sides of a median plane of the washer, said washer being of substantially uniform thickness throughout its extent.

3. A lock washer including an annular body of flat spring stock provided with a plurality of inner and outer marginal prongs, each prong having a marginal section overlapping the marginal section of an adjacent prong, whereby to present a plurality of inner and outer overlapping prong sections having work engaging edges positioned on opposite sides of a median plane of the washer, said edges lying in planes substantially parallel with said median plane, each prong being substantially uniform in thickness.

4. A lock washer including an annular body of flat spring stock provided with a plurality of inner and outer marginal prongs, each prong having a marginal section overlapping the marginal section of an adjacent prong, whereby to present a plurality of inner and outer overlapping prong sections having work engaging edges positioned on opposite sides of a median plane of the washer, said edges extending a radial distance which is at least equal to half the radial width of the washer body, said prongs being of substantially the original consistency of the stock.

5. A lock washer including an annular body of flat spring stock provided with a plurality of inner and outer marginal prongs, each prong having a marginal section overlapping the marginal section of an adjacent prong, whereby to present a plurality of inner and outer overlapping prong sections having work engaging edges positioned on opposite sides of a median plane of the washer, said edges extending a radial distance which is greater than half the radial width of the washer body, said prongs being of substantially the original consistency of the stock.

6. The method of producing lock washers which consists in radially severing inner and outer marginal portions of an annular body of spring stock, maintaining the washer in a flattened state, and reducing the outer diameter of the body to produce an overlapping relationship of the portions of the stock on opposite sides of the severances without affecting the original thickness of the main body of the stock.

7. The method of producing lock washers which consists in radially severing marginal portions of an annular body of spring stock, causing sections of the stock on each side of the severances to be deflected out of a median plane of a washer body so as to present a plurality of oppositely disposed work engaging edges, maintaining the washer in a flattened state, and reducing the outer diameter of the body to produce an overlapping relationship of the portions of the stock on opposite sides of the severances without affecting the original thickness of the main body of the stock.

8. The method of producing lock washers which consists in radially severing the inner and outer margins of an annular body of spring stock, and reducing the diameter of the body to produce an overlapping relationship of the stock positioned on opposite sides of said severances.

9. A lock washer including an inner series and outer series of annularly arranged prongs of spring stock, those of each series being disposed in overlapping relation, said prongs being of substantially the original consistency of the stock.

10. The method of making lock washers which includes the steps of providing radial severances along the inner and outer margins of annular spring stock, warping said prongs so as to present oppositely disposed work engaging edges, circumferentially shifting adjacent radial margins of each prong so as to effect the overlapping of said margins without affecting the uniform thickness of the prongs during said shifting.

11. The method of making lock washers which includes the steps of forming a plurality of inner and outer prongs along the inner and outer margins of annular flat spring stock, warping said prongs to present work engaging edges on opposite sides of the medial plane of said flat stock, maintaining the roots of said prongs within the medial plane of said flat stock, and causing adjacent margins of each pair of prongs to be disposed in overlapping relation while maintaining the body of each prong uniform in thickness.

FRANK W. ENGLAND.